US011047969B2

(12) United States Patent
Shimizu et al.

(10) Patent No.: US 11,047,969 B2
(45) Date of Patent: Jun. 29, 2021

(54) PERIPHERY MONITORING RADAR DEVICE

(71) Applicant: DENSO CORPORATION, Kariya (JP)

(72) Inventors: Naotsugu Shimizu, Kariya (JP);
Takayuki Kitamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/716,872

(22) Filed: Dec. 17, 2019

(65) Prior Publication Data

US 2020/0124713 A1 Apr. 23, 2020

Related U.S. Application Data

(63) Continuation of application No. PCT/JP2018/023309, filed on Jun. 19, 2018.

(30) Foreign Application Priority Data

Jun. 19, 2017 (JP) .............................. JP2017-119543

(51) Int. Cl.
*G01S 13/34* (2006.01)
*G01S 13/931* (2020.01)
*G01S 7/35* (2006.01)
*G01S 13/68* (2006.01)

(52) U.S. Cl.
CPC ............ *G01S 13/347* (2013.01); *G01S 7/354* (2013.01); *G01S 13/68* (2013.01); *G01S 13/931* (2013.01)

(58) Field of Classification Search
CPC ........ G01S 13/347; G01S 13/68; G01S 7/354; G01S 13/931
See application file for complete search history.

(56) References Cited

U.S. PATENT DOCUMENTS

| 6,061,015 A | 5/2000 | Sugimoto |
| 2004/0252047 A1 | 12/2004 | Miyake et al. |
| 2017/0153315 A1* | 6/2017 | Katayama ............... G01S 13/93 |

FOREIGN PATENT DOCUMENTS

| JP | H03-248073 A | 11/1991 |
| JP | H11-202049 A | 7/1999 |
| JP | 2004-340755 A | 12/2004 |
| JP | 2011-232115 A | 11/2011 |

* cited by examiner

*Primary Examiner* — Matthew M Barker
(74) *Attorney, Agent, or Firm* — Maschoff Brennan

(57) ABSTRACT

A periphery monitoring radar device includes a transmission unit, a reception unit, a spectrum generation unit, an azimuth calculation unit, an environment determination unit, and a position calculation unit. The transmission unit transmits a combination of transmission signals modulated using a plurality of modulation modes. The environment determination unit determines whether a peripheral environment is a complex environment from the degree of randomness of a frequency spectrum for each modulation mode. The position calculation unit removes, upon the peripheral environment for at least one modulation mode being determined to be the complex environment, at least one azimuth corresponding to the at least one modulation mode from the azimuths respectively calculated for modulation modes to thereby obtain at least one target azimuth that is at least one of the remaining azimuths except for the removed azimuth; and calculates a position of the vehicle based on the at least one target azimuth.

4 Claims, 11 Drawing Sheets

FIG.8

|  | FMCW | |
|---|---|---|
|  | NORMAL | DISTURBED |
| 2FCW / NORMAL | AVERAGE OF FMCW AND 2FCW | 2FCW |
| 2FCW / DISTURBED | FMCW | FMCW |

PERIPHERY MONITORING RADAR DEVICE

CROSS-REFERENCE TO RELATED APPLICATION

The present application is a continuation application of International Application No. PCT/JP2018/023309, filed Jun. 19, 2018, which claims priority to Japanese Patent Application No. 2017-119543 filed Jun. 19, 2017. The contents of these applications are incorporated herein by reference in their entirety.

BACKGROUND

Technical Field

The present disclosure relates to a radar device that monitors the periphery of a vehicle.

Background Art

In the prior art, as radar devices that monitor objects in the periphery of vehicles, there are radar devices in which a plurality of modulation modes are used in combination to improve the detection accuracy of the objects.

SUMMARY

In the present disclosure, provided is a periphery monitoring radar device as the following. The periphery monitoring radar device includes a transmission unit, a reception unit, a spectrum generation unit, an azimuth calculation unit, an environment determination unit, and a position calculation unit. The transmission unit transmits a combination of transmission signals modulated using a plurality of modulation modes. The environment determination unit determines whether a peripheral environment is a complex environment from the degree of randomness of a frequency spectrum for each of the plurality of modulation modes. The position calculation unit removes, upon the peripheral environment of the vehicle for at least one modulation mode in the plurality of modulation modes being determined to be the complex environment, at least one azimuth corresponding to the at least one modulation mode from the azimuths respectively calculated for the plurality of modulation modes to thereby obtain at least one target azimuth that is at least one of the remaining azimuths except for the removed azimuth; and calculates a position of the vehicle based on the at least one target azimuth.

BRIEF DESCRIPTION OF THE DRAWINGS

FIG. 8 is a diagram illustrating specifications which has defined azimuth information used according to the situation.

DETAILED DESCRIPTION OF THE PREFERRED EMBODIMENTS

Figure 1:
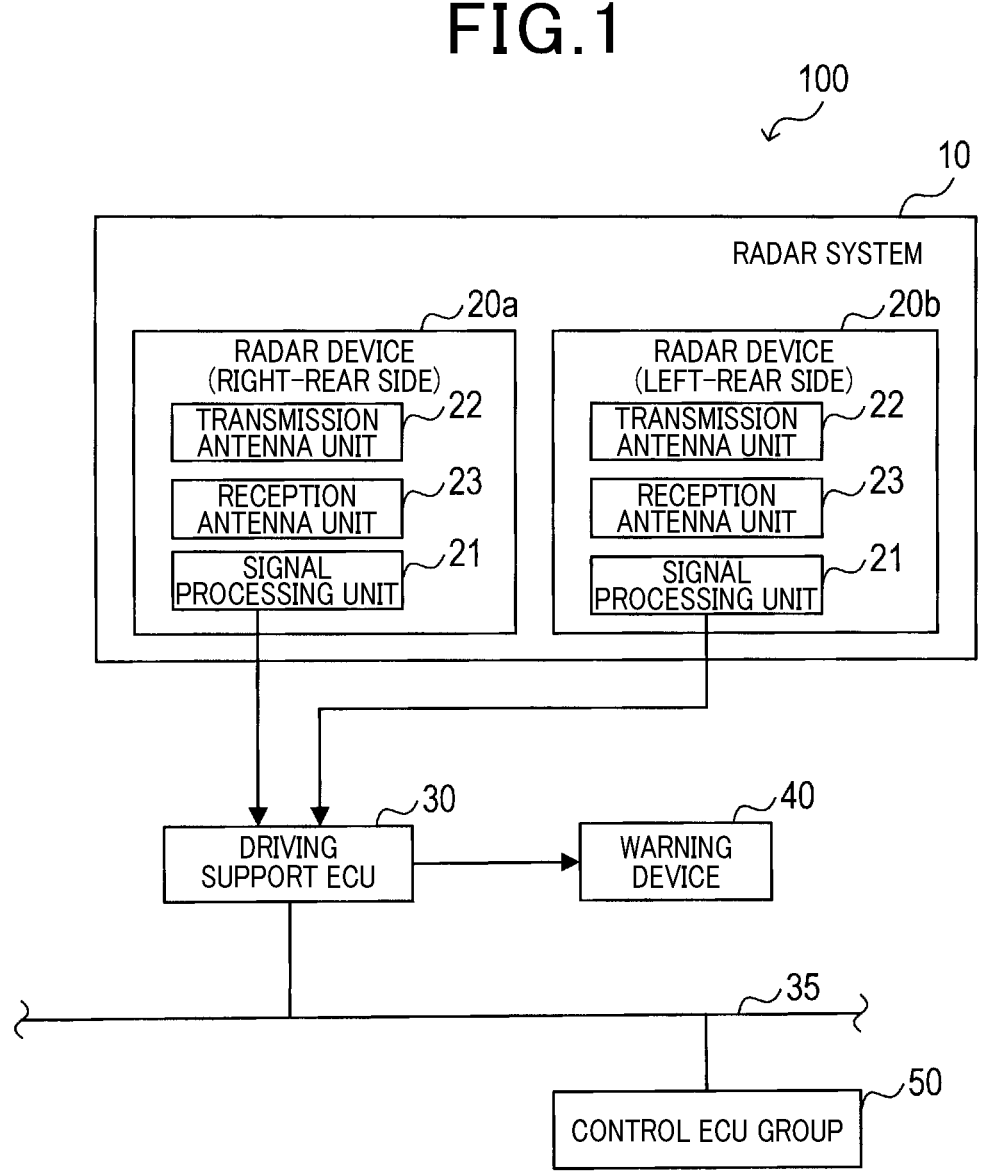
FIG. 1 is a block diagram illustrating a configuration of an in-vehicle system according to the present embodiment.

As radar devices that monitor objects in the periphery of vehicles, there are radar devices in which a plurality of modulation modes are used in combination to improve the detection accuracy of the objects. For example, the vehicle radar device described in PTL 1 shown below transmits a combination of a radar wave modulated by the FMCW modulation mode and a radar wave modulated by the CW modulation mode. The vehicle radar device uses the results of detection by the CW modulation mode to determine the presence or absence of overlapping peaks in a frequency spectrum calculated on the FMCW modulation mode. With overlapping peaks, the vehicle radar device uses an azimuth calculated from a signal obtained by the CW modulation mode. Without overlapping peaks, the vehicle radar device uses an azimuth calculated from a signal obtained by the FMCW modulation mode.

A radar device mounted to a vehicle may have a decreased accuracy in calculating an azimuth of a monitoring target due to peripheral environment of the own vehicle. For example, in the FMCW modulation mode, in an environment where another vehicle as a monitoring target runs near a continuous roadside object or the like, the radar device may detect an overlap of the peak of the roadside object and the peak of the monitoring target as one peak in the frequency spectrum. If the difference in azimuth between the roadside object and the monitoring target with the peaks appearing at the same position is equal to or greater than the azimuth resolution of the radar device, the two are detected as separate objects and their individual azimuths are calculated. However, if the difference in azimuth between the roadside object and the monitoring target is smaller than the azimuth resolution of the radar device, the two are detected as one object and an azimuth between the two is calculated. When the radar device recognizes the detected object as a monitoring target, the azimuth of the monitoring target becomes erroneous with a shift of the actual position of the other vehicle toward the roadside object, thereby resulting in decrease of the calculation accuracy. This leads to a decrease in the calculation accuracy of position of the object calculated using the azimuth.

In addition, using the CW modulation mode, for example, in an environment where another vehicle as a monitoring target runs side-by-side near the own vehicle, a large number of peaks may appear at a wide variety of frequencies based on reflected waves from the wheels of the monitoring target in the frequency spectrum. This is because the wheels have various velocity components. Thus, it is difficult to extract peaks corresponding to the velocity of the other vehicle from the frequency spectrum. Even if the peaks can be extracted, the azimuths of the peaks and the azimuths of reflection from the wheels cannot be accurately separated at the time of azimuth development, thereby causing decrease in the calculation accuracy of the azimuth of the monitoring target. This leads to a decrease in the calculation accuracy of the position of the object calculated using the azimuth.

[PTL 1] JP 2004-340755 A

The vehicle radar device uses the results of detection using the CW modulation mode to determine the presence or absence of overlapping peaks in the frequency spectrum calculated using the FMCW modulation mode. Thus, the vehicle radar device has been found to have a problem that, when the peripheral environment of the own vehicle is an environment with a decrease in the calculation accuracy of the azimuth in the CW modulation mode, the presence or absence of overlapping peaks may be wrongly determined. Specifically, the vehicle radar device has been found to have a problem that, even though the azimuth calculated from a signal obtained using the FMCW modulation mode is higher in accuracy, the azimuth calculated from a signal obtained using the CW modulation mode may be used. Accordingly, it has been discovered that the vehicle radar device has a problem that the calculation accuracy of position of the object may decrease.

One desired aspect of the present disclosure is to provide a periphery monitoring radar device that calculates the position of an object with high accuracy.

One aspect of the present disclosure is a periphery monitoring radar device that is mounted to a vehicle to monitor an object in a periphery of the vehicle and includes a transmission unit, a reception unit, a spectrum generation unit, an azimuth calculation unit, an environment determination unit, and a position calculation unit. The transmission unit transmits a combination of transmission signals modulated using a plurality of modulation modes as a radar wave. The reception unit generates a reception signal from a reflected wave from an object. The object reflects the radar wave transmitted by the transmission unit as the reflected wave. The spectrum generation unit generates a frequency spectrum based on the reception signal generated by the reception unit for each of the plurality of modulation modes. The azimuth calculation unit extracts one or more peaks corresponding to the object from the corresponding frequency spectrum generated by the spectrum generation unit, subjects the extracted one or more peaks to azimuth development to accordingly calculate an azimuth of the object for each of the plurality of modulation modes. The environment determination unit determines whether a peripheral environment of the vehicle is a complex environment with a decrease in calculation accuracy of the azimuth for the corresponding modulation mode, based on a degree of randomness of the corresponding frequency spectrum generated by the spectrum generation unit. The position calculation unit removes, upon the peripheral environment of the vehicle for at least one modulation mode in the plurality of modulation modes being determined to be the complex environment, at least one azimuth corresponding to the at least one modulation mode from the azimuths respectively calculated for the plurality of modulation modes to thereby obtain at least one target azimuth that is at least one of the remaining azimuths except for the removed azimuth; and calculates a position of the vehicle based on the at least one target azimuth.

According to the one aspect of the present disclosure, the combination of the transmission signals modulated by the plurality of modulation modes is transmitted as the radar wave. Then, the frequency spectrum is generated based on the reception signal for each of the modulation modes. Further, the peak corresponding to the object is extracted from the frequency spectrum, the extracted peak is subjected to azimuth development, and the azimuth of the object is calculated.

For each modulation mode, the peripheral environment of the vehicle where the calculation accuracy of the azimuth decreases is different. Therefore, even in the case where the calculation accuracy of the azimuth decreases in any of a plurality of modulation modes, the azimuth may be calculated accurately in other modulation modes. Thus, it is determined, from the degree of randomness of the frequency spectrum generated for each of the modulation modes, whether the peripheral environment of the vehicle is a complex environment with a decrease in the calculation accuracy of the azimuth for the corresponding modulation mode. Then, the position of the object is calculated using the azimuth calculated in the modulation mode other than the modulation mode where it is determined that the peripheral environment is a complex environment. Therefore, the position of the object can be calculated with accuracy. Further, it is possible to calculate with accuracy the trajectory of the object as a monitoring target determined from the position information of the object for use in various controls.

The reference signs in parentheses described in the claims merely indicate correspondences with specific means in an embodiment described later as a mode and are not intended to limit the technical scope of the present disclosure.

Hereinafter, exemplary embodiments for carrying out the present disclosure will be described with reference to the drawings.

[1. Configuration]

First, an in-vehicle system 100 according to the present embodiment will be described with reference to FIG. 1. The in-vehicle system 100 is a system mounted to a vehicle that includes a radar system 10, a driving support ECU 30, a warning device 40, and a control ECU group 50.

The radar system 10 includes radar devices 20*a* and 20*b*. The radar device 20*a* is a right-rear radar device that is installed on the right side surface of rear part of the vehicle. The radar device 20*b* is a left-rear radar device that is installed on the left side surface of rear part of the vehicle. The radar device 20*a* and the radar device 20*b* are basically the same in configuration and functions. In the following description, the radar device 20*a* and the radar device 20*b* will be collectively called radar device 20. The radar system 10 preferably includes at least one radar device 20. That is, the radar system 10 may include one radar device 20 or three or more radar devices 20. In the present embodiment, the radar device 20 corresponds to a periphery monitoring radar device.

The radar device 20 is a millimeter wave radar that monitors the periphery of an own vehicle 70 through repeated transmission and reception of radar waves. The radar device 20 includes a signal processing unit 21, a transmission antenna unit 22, and a reception antenna unit 23. The signal processing unit 21 generates a combination of transmission signals modulated by a plurality of modulation modes, and causes the transmission antenna unit 22 to emit a transmission wave as a radar wave based on the generated combination of transmission signals.

Figure 2:
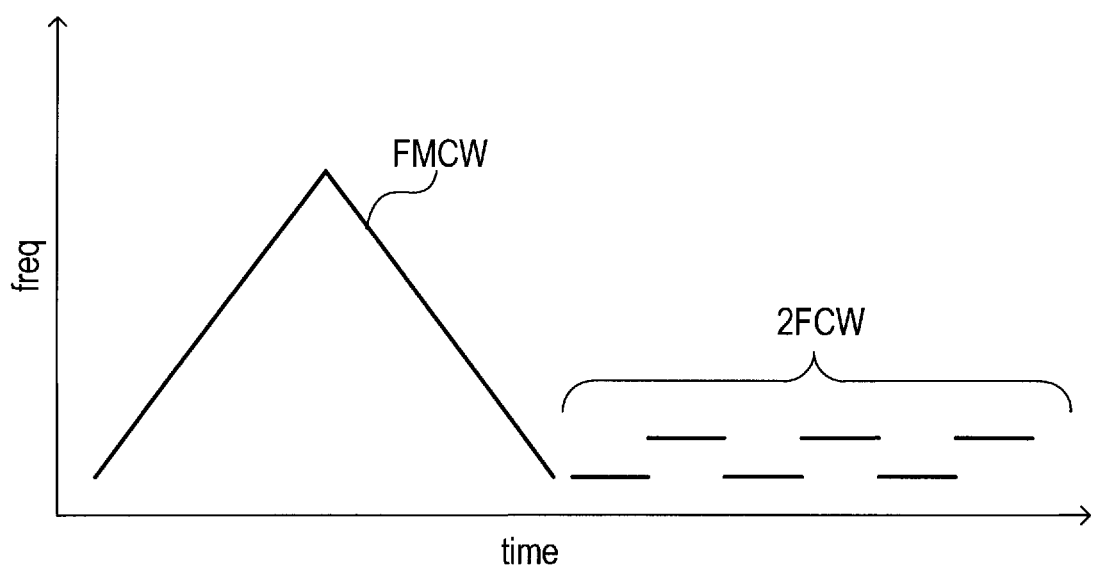
FIG. 2 is a diagram illustrating waveforms of radar waves transmitted from a radar device according to the present embodiment.

In the present embodiment, as illustrated in FIG. 2, the transmission signal modulated by the FMCW mode and the transmission signal modulated by the 2FCW mode are combined into one set. The transmission antenna unit 22 repeatedly transmits a radar wave based on the one set of transmission signals in a predetermined cycle. The term FMCW is an abbreviation for frequency modulated continuous wave, and the term 2FCW is an abbreviation for 2 frequency continuous wave.

The reception antenna unit 23 has N antennas arranged in a line in a vehicle width direction to receive reflected waves returned from an object having reflected the transmission wave, as reception waves. N indicates an integer which is 2 or larger. The signal processing unit 21 generates a reception signal from the reception wave received by each of the N antennas included in the reception antenna unit 23, and generates a beat signal for each of the antennas. The beat signal refers to a frequency difference signal that has a difference in frequency between the transmission signal and the reception signal as a frequency.

The signal processing unit 21 further executes a frequency analysis process such as FFT on the generated beat signal to generate a frequency spectrum. At that time, the signal processing unit 21 generates the frequency spectrum from the beat signal for each of the modulation modes. In the present embodiment, the signal processing unit 21 generates a frequency spectrum Sp_up for each of the antennas from the frequency rising part of the FMCW mode of the beat signal, and generates a frequency spectrum Sp_dn for each of the antennas from the frequency falling part of the FMCW mode of the beat signal. Then, the signal processing unit 21 extracts an azimuth θ and power information for each of peaks of the frequency spectrums Sp_up and Sp_dn.

Specifically, in each of the frequency spectrums Sp_up and Sp_dn, the signal processing unit 21 performs a direction-of-arrival estimation process using an algorithm such as Multiple Signal Classification (hereinafter, called MUSIC) for N peak frequency components of the same frequency collected from each of the antennas to extract the azimuths θ. The signal processing unit 21 uses the extracted azimuths θ and power information to perform pair-matching between the peak frequencies of the frequency spectrum Sp_up and the peak frequencies of the frequency spectrum Sp_dn corresponding to the same object. Then, for each object, the signal processing unit 21 calculates a relative velocity Vr of the object to the own vehicle 70 and a distance R from the own vehicle 70 to the object, from the pair-matched peak frequencies of the frequency spectrums Sp_up and Sp_dn.

For the parts of the FMCW mode of the beat signal, the signal processing unit 21 may use the azimuth θ of the object extracted from either the frequency rising part or the frequency falling part of the beat signal as the azimuth θ of the FMCW mode. The signal processing unit 21 may also use an average of the azimuths θ of the object extracted from the frequency rising part and the frequency falling part as the azimuth θ of the FMCW mode.

The signal processing unit 21 further generates a frequency spectrum Sp_cw for each of the antennas from the part of the 2FCW mode of the beat signal. For the part of the 2FCW mode of the beat signal, the signal processing unit 21 generates a frequency spectrum from each of the beat signals at the two transmission frequencies for each of the antennas, and generates the frequency spectrum Sp_cw by adding up the two generated frequency spectrums. Then, the signal processing unit 21 extracts the azimuth θ and power information at each of peaks of the frequency spectrum Sp_cw. The azimuth θ can be determined by performing the direction-of-arrival estimation process using an algorithm such as MUSIC.

The signal processing unit 21 uses the extracted azimuths θ and power information to calculate the relative velocity Vr of the object to the own vehicle 70 and the distance R from the own vehicle 70 to the object from the peak frequencies of the frequency spectrum Sp_cw. Specifically, the signal processing unit 21 calculates the distance R, the azimuth θ, and the relative velocity Vr of the object from the part of the beat signal obtained by the FMCW mode, and calculates the distance R, the azimuth θ, and the relative velocity Vr of the object from the part of the beat signal about obtained by the 2FCW mode.

Figure 3:
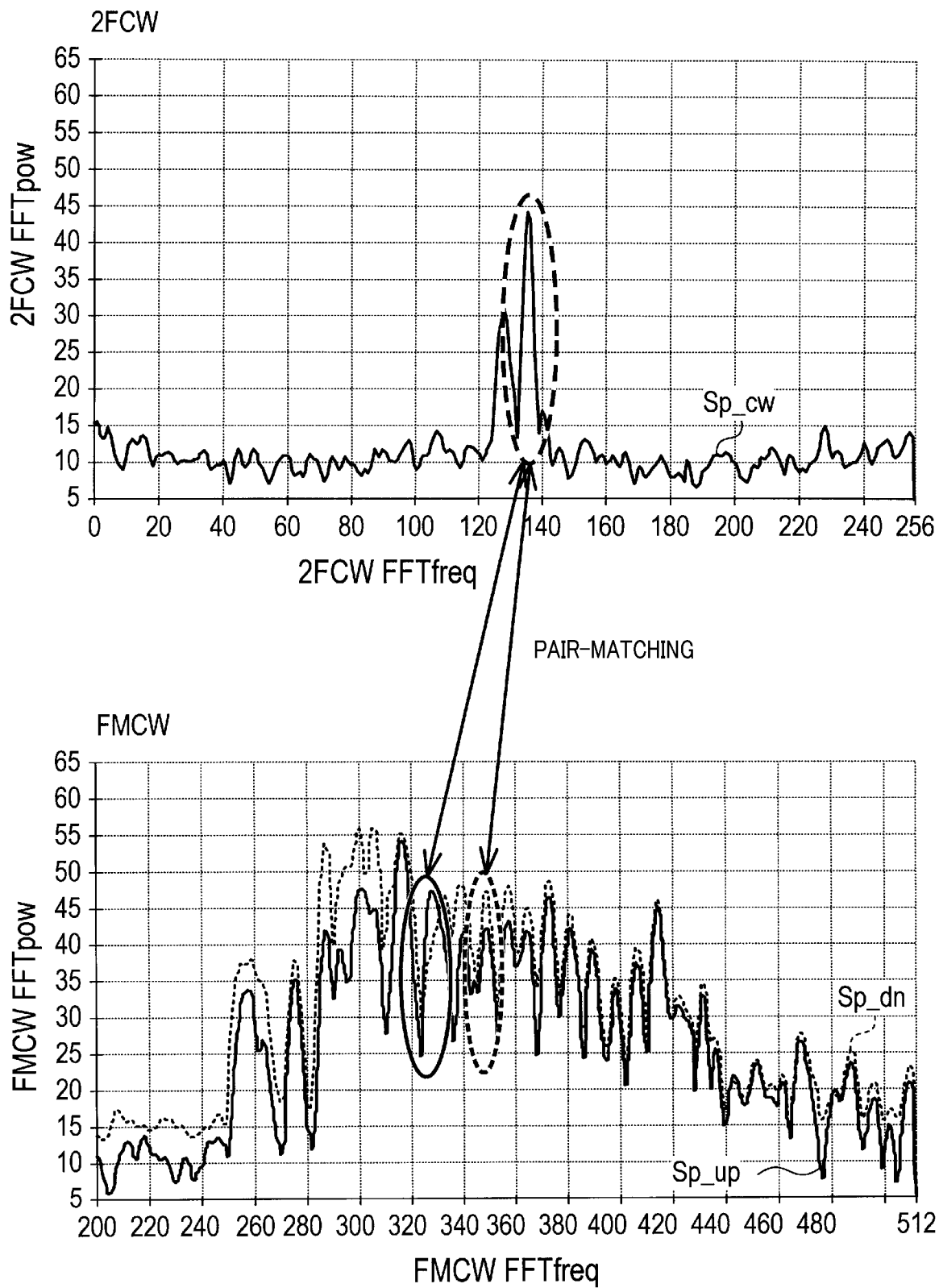
FIG. 3 is a diagram illustrating pair-matching between a peak of a frequency spectrum waveform for a 2FCW mode and peaks of a frequency spectrum waveform for an FMCW mode.

Then, as illustrated in FIG. 3, the signal processing unit 21 uses the calculated relative velocity Vr, an azimuth θ, and power information of each object to perform pair-matching between the peak frequency of the frequency spectrum Sp_cw and the pair of peak frequencies of the frequency spectrums Sp_up and Sp_dn corresponding to the same object.

The signal processing unit 21 then generates object information based on the frequency spectrums, and outputs the generated object information to the driving support ECU 30. The object information includes a position P of the object calculated from the distance R and the azimuth θ of the object, and the relative velocity Vr of the object. The azimuth θ of the object for use in the calculation of the position P of the object will be described later in detail. In the present embodiment, the transmission antenna unit 22 and the signal processing unit 21 correspond to the transmission unit, and the reception antenna unit 23 and the signal processing unit 21 correspond to the reception unit. The signal processing unit 21 implements the functions of a spectrum generation unit, an azimuth calculation unit, an environment determination unit, and a position calculation unit.

The control ECU group 50 includes a plurality of ECUs mounted in the own vehicle excluding the driving support ECU 30, and is connected to a network 6.

The driving support ECU 30 acquires from each radar devices 20 the object information of the object detected by each radar device 20, and exchanges data with the control ECU group 50 via the network 6. When there exists an object in the periphery of the own vehicle that may collide with the own vehicle, the driving support ECU 30 outputs a warning output command to the warning device 40.

The warning device 40 is an indicator provided on a door mirror or in a vehicle interior, a speaker in the vehicle interior, a display in the vehicle interior, or the like. The warning device 40 outputs a sound for warning or calling attention or displays a warning message according to the warning output command from the driving support ECU 30.

[2. Azimuth Calculation Accuracy]

Figure 4:
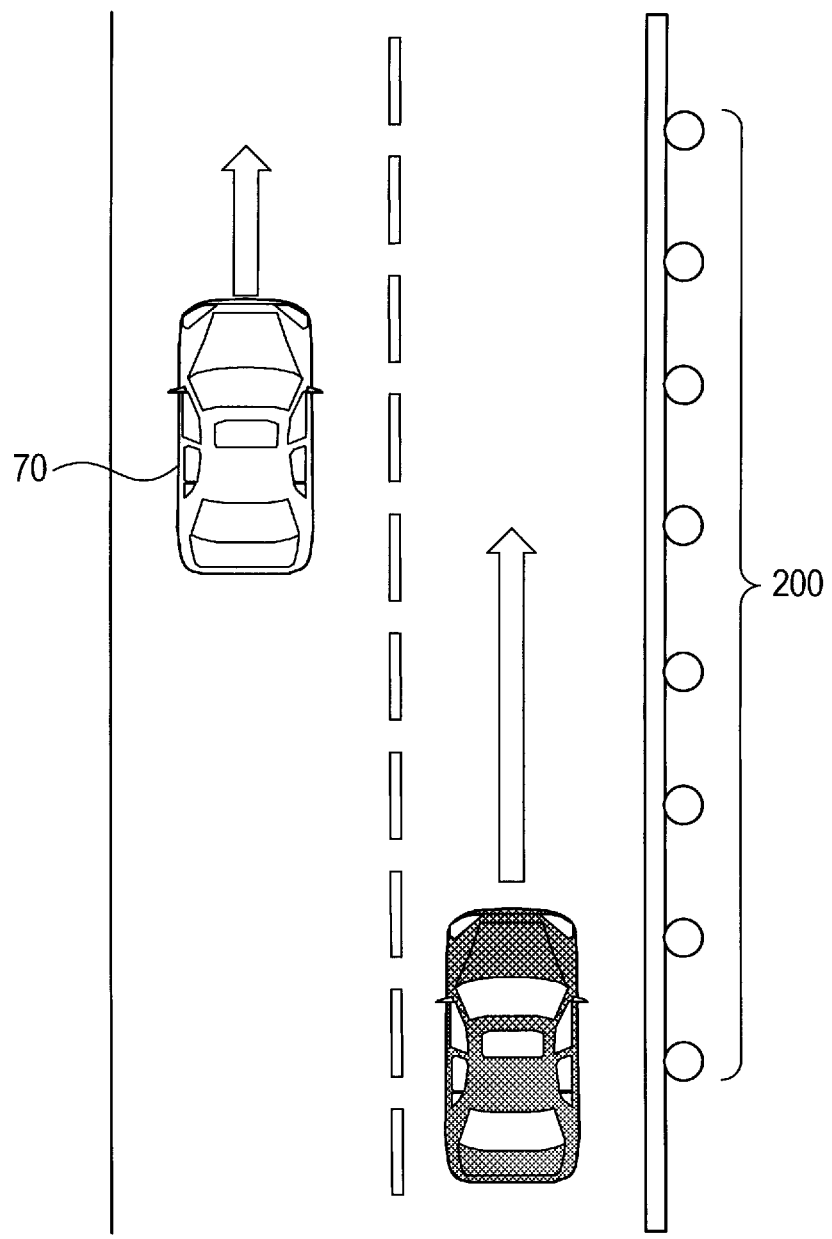
FIG. 4 is a diagram describing a situation in which there is a roadside object in the periphery of an own vehicle.
Figure 5:
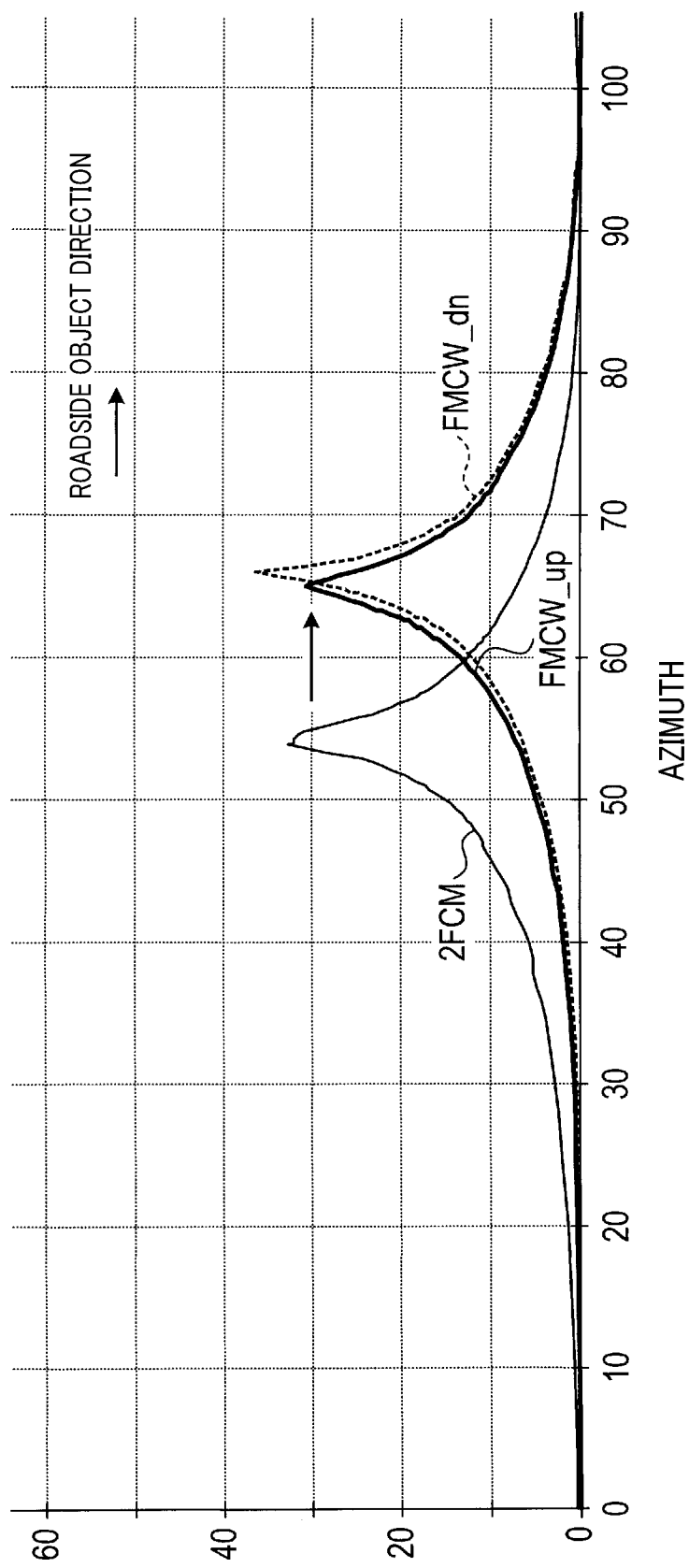
FIG. 5 is a diagram illustrating an azimuth spectrum waveforms of the 2FCW mode and the FMCW mode in the presence of a roadside object.

The calculation accuracy of the azimuth θ of the object may decrease depending on the peripheral environment of the own vehicle 70. The peripheral environment with decrease in the calculation accuracy of the azimuth θ of the object varies depending on the modulation modes. For the FMCW mode, for example, in the presence of a roadside object 200 as a high-reflection object in the periphery of the own vehicle 70 as illustrated in FIG. 4, the calculation accuracy of the azimuth θ of the object decreases. The roadside object 200 is a guard rail, a sound barrier, or the like.

Figure 7:
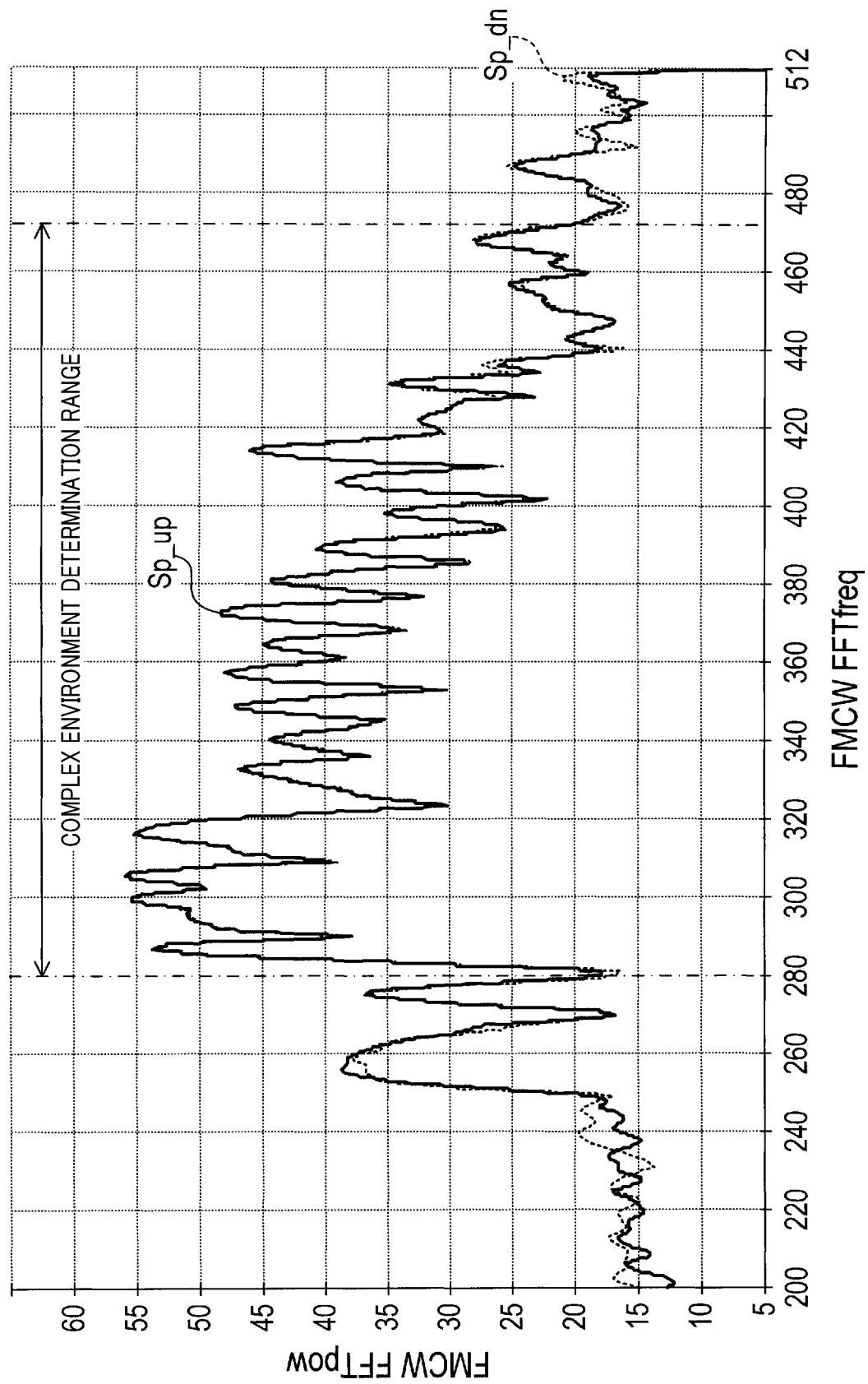
FIG. 7 is a diagram illustrating a frequency spectrum waveform of the FMCW mode in a complex environment.

For the FMCW mode, the frequency of the beat signal depends on the distance R and the relative velocity Vr of the object. When there exists a continuous high-reflection object such as the roadside object 200 in the periphery of the own vehicle 70, a large number of peaks appear over a wide range of frequencies in the frequency spectrums Sp_up and Sp_dn as illustrated in FIG. 7. Accordingly, the peaks of the roadside object 200 appear at the same positions as the peaks of the object as a monitoring target in the frequency spectrums Sp_up and Sp_dn. When the difference in azimuth between the object and the roadside object 200 of which the peaks appear at the same positions is smaller than the azimuth resolution of the radar device 20, the radar device 20 cannot calculate separately the azimuth of the roadside object 200 and the azimuth of the object. As a result, the azimuth of the object is calculated as an intermediate azimuth between the azimuth of the roadside object 200 and the actual azimuth of the object. That is, the azimuth of the object is calculated as an erroneous azimuth with a shift from the actual azimuth toward the roadside object 200.

In contrast to this, in the 2FCW mode, the frequency of the beat signal depends on the relative velocity Vr of the object but does not depend on the distance R of the object. Accordingly, even if there exists a roadside object 200 in the periphery of the own vehicle 70, the peaks appear in a frequency bin corresponding to the velocity obtained by projecting the own vehicle velocity in the direction of the roadside object in the frequency spectrum Sp_cw. In addition, the roadside object 200 existing behind the own vehicle 70 has a velocity in a direction separating from the own vehicle 70, that is, a negative relative velocity, and thus there basically occurs no overlap between the frequency peak of the object to be detected approaching the own vehicle 70 and the frequency peak of the roadside object 200 or the like not to be detected. Therefore, even if there exists the roadside object 200 in the periphery of the own vehicle 70, the azimuth θ of the object calculated on the 2FCW mode does not shift toward the roadside object 200 and the calculation accuracy does not decrease.

On the other hand, in the 2FCW mode, when another vehicle exists in the vicinity of the own vehicle 70, for example, when another vehicle is running side by side with the own vehicle 70, the calculation accuracy of the azimuth θ of the object decreases. When there exists another vehicle in the vicinity of the own vehicle 70, the reception wave received by the radar device 20 contains reflected waves reflected by the wheels of the other vehicle. Since the wheels have various velocity components, if the reception wave contains the reflected waves reflected by the wheels, the frequency of the beat signal calculated from the reception wave contains various velocity components. Accordingly, when another vehicle exists in the vicinity of the own vehicle 70, a large number of peaks appear over a wide range of frequencies in the frequency spectrum Sp_cw. As a result, the calculation accuracy of the azimuth θ of the object calculated in the 2FCW mode decreases. When another vehicle is distant from the own vehicle 70, the influence of reflection from the wheels of the other vehicle becomes small, thereby suppressing the occurrence of a large number of peaks over a wide range of frequencies in the frequency spectrum Sp_cw.

Figure 6:
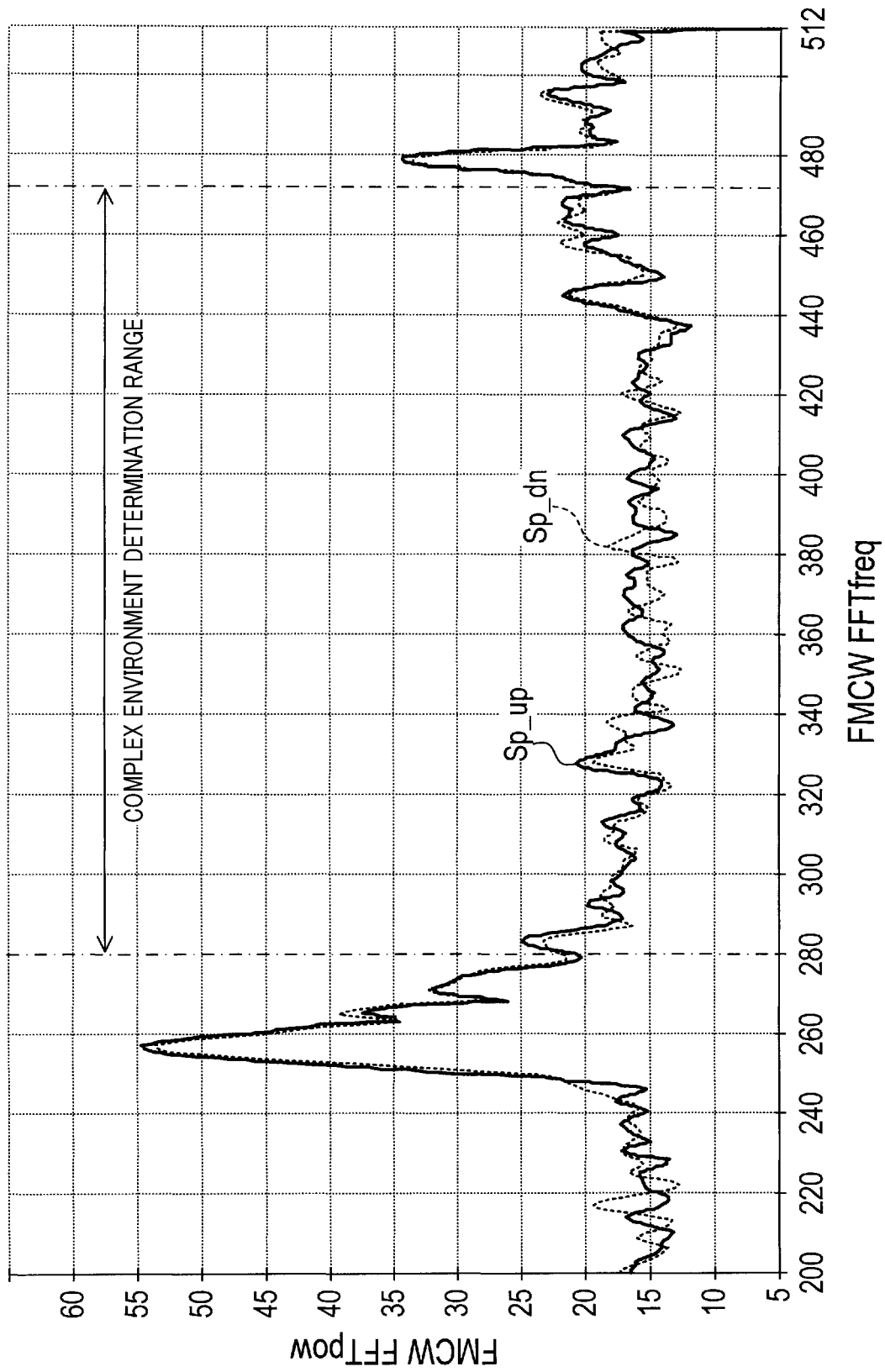
FIG. 6 is a diagram illustrating a frequency spectrum waveform of the FMCW mode in a clear environment.

From the foregoing matter, as illustrated in FIG. 6, for the FMCW mode, when the peripheral environment of the own vehicle 70 is a clear environment where no roadside object 200 or the like exists, the degree of randomness of the frequency spectrums Sp_up and Sp_dn becomes relatively low and the azimuth θ of the object can be calculated with high accuracy. In addition, as illustrated in FIG. 7, for the FMCW mode, when the peripheral environment of the own vehicle 70 is a complex environment where there is a roadside object 200 or the like, the degree of randomness of the frequency spectrums Sp_up and Sp_dn become relatively high and the calculation accuracy of the azimuth θ of the object decreases.

Similarly, for the 2FCW mode, when the peripheral environment of the own vehicle 70 is a clear environment where there exists no another vehicle in the vicinity, the degree of randomness of the frequency spectrum Sp_cw becomes relatively low and the azimuth θ of the object can be calculated with high accuracy. In addition, for the 2FCW mode, when the peripheral environment of the own vehicle 70 is a complex environment where there exists another vehicle in the vicinity, the degree of randomness of the frequency spectrum Sp_cw becomes relatively high and the calculation accuracy of the azimuth θ of the object decreases.

Accordingly, in the present embodiment, for both the FMCW mode and the 2FCW mode, as illustrated in FIG. 8, when the degree of randomness of the frequency spectrum is low, that is, is in the normal state, the average of the azimuths θ of the object calculated using the two modulation modes is used to calculate the position P of the object. This improves the stability of the azimuth θ of the object. When the degree of randomness of the frequency spectrum of one of the FMCW mode and the 2FCW mode is high, the azimuth θ of the object calculated using that modulation mode is excluded and the azimuth θ of the object calculated in the other modulation mode is used to calculate the position P of the object.

When the degree of randomness of the frequency spectrum is high for both the FMCW mode and the 2FCW mode, the azimuth θ of the object calculated using the FMCW mode is used to calculate the position P of the object. In general, for the FMCW mode, when the calculation accuracy of the azimuth θ of the object decreases, the azimuth between the object and the roadside object 200 or the like is detected. In contrast to this, when the calculation accuracy of the azimuth θ of the object in the 2FCW mode decreases, an azimuth unrelated to the object to be detected may be detected, such as an azimuth detected by the tire track of the peripheral vehicle. Accordingly, when the calculation accuracy of the azimuth θ of the object decreases for both the FMCW mode and the 2FCW mode, the azimuth θ of the object calculated using the FMCW mode is used because there is a high possibility that the azimuth θ calculated using the FMCW mode is closer to the azimuth θ of the object to be detected.

For both the FMCW mode and the 2FCW mode, when the peripheral environment of the own vehicle 70 is a complex environment, the calculation accuracy of the azimuth θ of the object decreases but the calculation accuracies of the distance R and the relative velocity Vr of the object are not affected. Thus, for the distance R and the relative velocity Vr of the object, the values calculated using either the FMCW mode or the 2FCW mode can be used. In the present embodiment, the distance R and the relative velocity Vr of the object calculated using the FMCW mode are used.

[3. Process]

Figure 9:
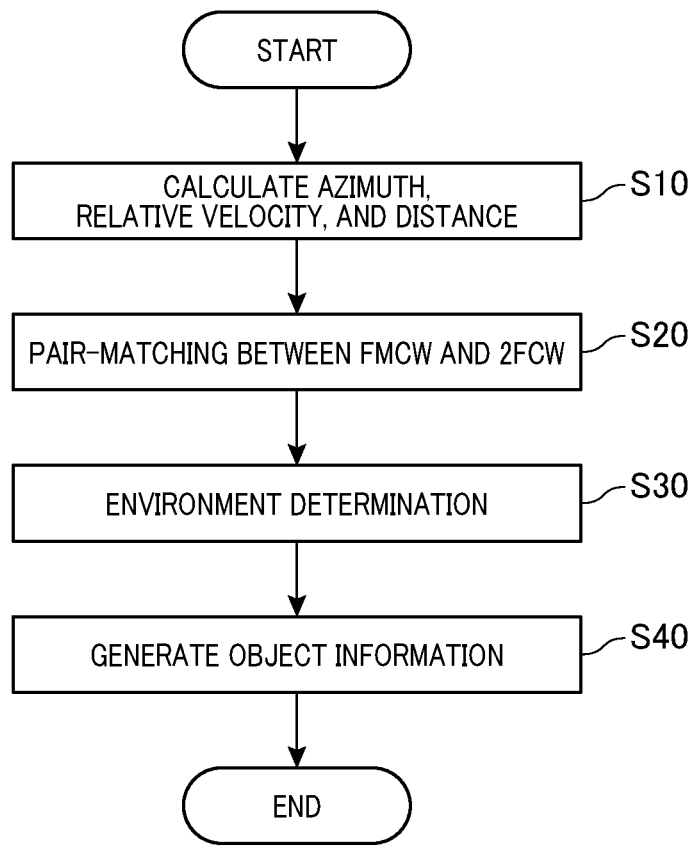
FIG. 9 is a flowchart of a process procedure for calculating the position of an object.

Next, a process procedure of calculating the position of the object will be described with reference to the flowchart illustrated in FIG. 9. This process procedure is performed by the signal processing unit 21 at each generation of the frequency spectrums Sp_up, Sp_dn, and Sp_cw of a beat signal.

First, in S10, the signal processing unit 21 extracts peaks from the frequency spectrums Sp_up, Sp_dn, and Sp_cw, respectively, and extracts power information for each of the peaks, and then extracts the azimuths θ in which reflected waves come from peak frequency components collected from the N antennas. Then, the signal processing unit 21 uses the extracted azimuths θ and power information to perform pair-matching between the frequency peaks of the frequency spectrums Sp_up and Sp_dn corresponding to the same object to calculate the relative velocity Vr and the distance R of the object. The signal processing unit 21 also calculates the relative velocity Vr and the distance R of the object from the peak frequency of the frequency spectrum Sp_cw.

Then, in S20, for each object, the signal processing unit 21 performs pair-matching between the peak frequency in the frequency spectrum Sp_cw and the pair of peak frequencies in the frequency spectrums Sp_up and Sp_dn corresponding to the same object.

Then, in S30, the signal processing unit 21 determines from the degree of randomness of each of the frequency spectrums Sp_up, Sp_dn, and Sp_cw whether the peripheral environment of the own vehicle 70 is a complex environment with a decrease in the calculation accuracy of the azimuth θ of the object for each of the FMCW mode and the 2FCW mode. Specifically, in the case of the FMCW mode, the signal processing unit 21 determines that the peripheral environment of the own vehicle 70 is a complex environment when at least one of the following conditions (i) and (ii) is satisfied: (i) in a complex environment determination range, the number of peaks in the frequency spectrum Sp_up or the frequency spectrum Sp_dn is larger than a preset threshold; and (ii) in the complex environment determination range, the average value of peak power obtained by averaging values of power at the peaks in the frequency spectrum Sp_up or the frequency spectrum Sp_dn is larger than a preset peak threshold. With three peaks, the average value of the peak powers would be a value obtained by averaging three power values.

The complex environment determination range is a predetermined range of a frequency spectrum as illustrated in FIGS. 6 and 7. The complex environment determination range is preset according to the range of the distance R of the object as a monitoring target. That is, the range in the presence of the object as a monitoring target constitutes the complex environment determination range. In the case of the 2FCW mode, similarly, the signal processing unit 21 determines that the peripheral environment of the own vehicle 70 is a complex environment when at least one of the conditions (i) and (ii) is satisfied. In the case of the 2FCW mode, however, the complex environment determination range is preset according to the range of the relative velocity Vr of the object as a monitoring target.

Further, in the case of the FMCW mode, the signal processing unit 21 may determine that the peripheral environment of the own vehicle 70 is a complex environment when at least one of the conditions (i), (ii), and the following condition (iii) is satisfied: (iii) in the complex environment determination range, the average power in the frequency spectrum Sp_up or the frequency spectrum Sp_dn is larger than a preset average threshold. In the case of the 2FCW mode, similarly, the signal processing unit 21 may determine that the peripheral environment of the own vehicle 70 is a complex environment when at least one of the conditions (i), (ii), and (iii) is satisfied. In the case of the 2FCW mode, however, the average power in the frequency spectrum Sp_cw is compared to the average threshold.

Subsequently, in S40, the signal processing unit 21 generates object information on the object extracted in S10. First, the signal processing unit 21 determines the azimuth θ of the object to be used in the calculation of position of the object, based on the results of the determination in S30 and the specifications illustrated in FIG. 8. Then, the signal processing unit 21 calculates the position P of the object from the determined azimuth θ of the object and the distance R of the object calculated in S10, and generates the object information including the position P of the object and the relative velocity Vr of the object calculated in S10. Then, the signal processing unit 21 terminates this process.

[4. Operations]

Figure 10:
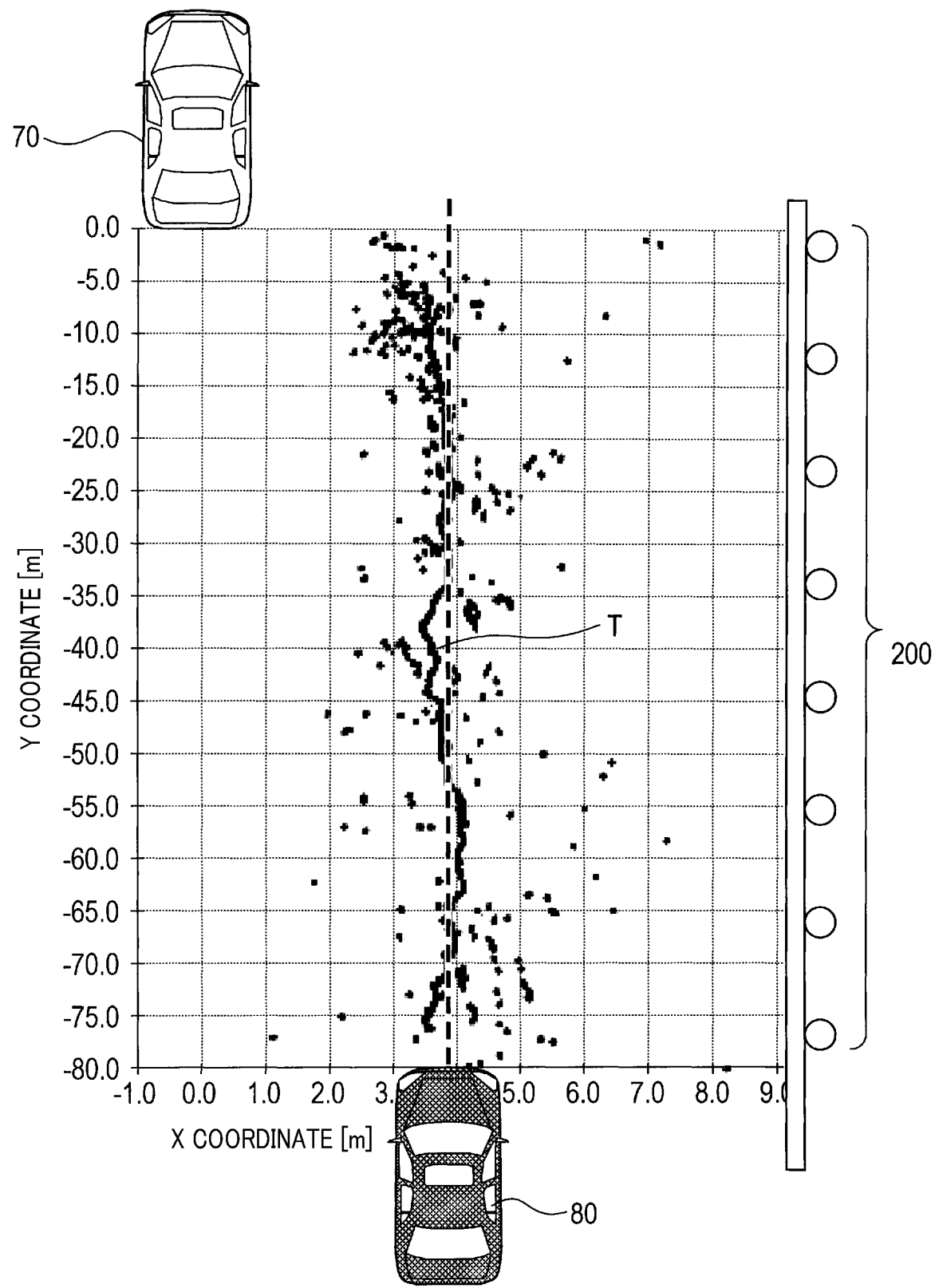
FIG. 10 is a diagram illustrating a trajectory of another vehicle when using azimuth information in a modulation mode under a clear environment in the presence of a roadside object.
Figure 11:
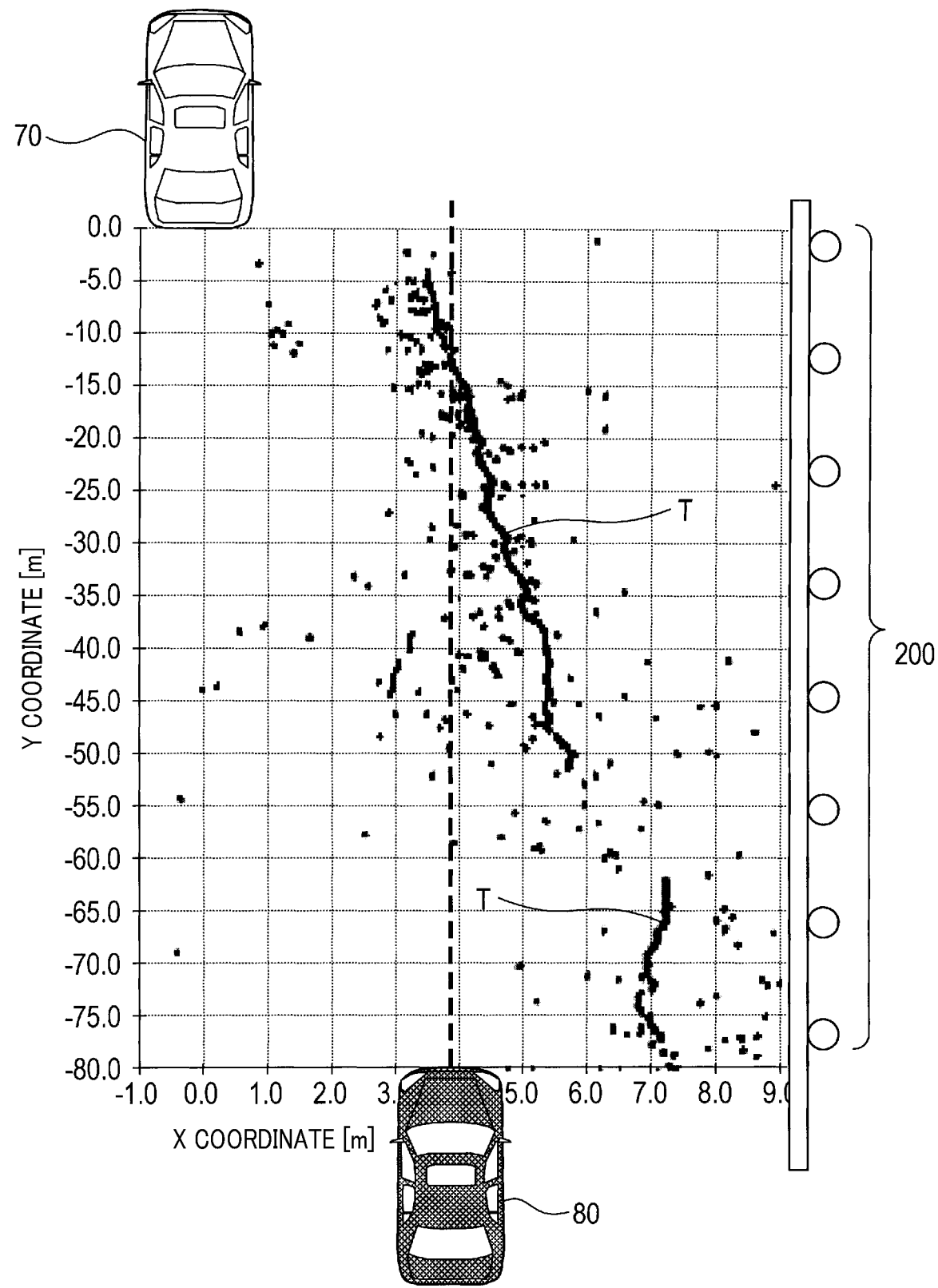
FIG. 11 is a diagram illustrating a trajectory of another vehicle when using an average of azimuth information in the 2FCW mode and azimuth information in the FMCW mode in the presence of a roadside object.

FIG. 10 illustrates a trajectory T that is determined from the position P of another vehicle 80 calculated using the azimuth θ of the object determined under the specifications illustrated in FIG. 8. FIG. 11 illustrates a trajectory T that is determined from the position P of the other vehicle 80 calculated using the average value of the azimuths θ of the object calculated using the FMCW mode and the 2FCW mode. FIGS. 10 and 11 indicate the width direction of a road in an x coordinate and vehicle rear side in the travelling direction in a y coordinate, and show a state where the own vehicle 70 is running along the y direction in the road with the roadside object 200 on the right side. That is, FIGS. 10 and 11 show a state where the peripheral environment of the own vehicle 70 is a complex environment, for the FMCW mode. The other vehicle 80 is linearly running behind the own vehicle 70. The straight broken line shows the actual trajectory of the other vehicle 80.

Referring to FIG. 10, the azimuth θ of the object with a lower calculation accuracy is not used but only the azimuth θ of the object with a higher calculation accuracy is used, so that the trajectory T is detected corresponding to the actual behavior of the other vehicle 80. In contrast to this, referring to FIG. 11, the average of the azimuth θ of the object including an error with a shift toward the roadside object 200 and the azimuth θ of the object with a higher calculation accuracy is used, so that the trajectory T is detected in the middle between the actual trajectory of the other vehicle 80 and the roadside object 200.

Referring to FIG. 11, the trajectory T becomes closer to the actual trajectory of the other vehicle 80 with increasing proximity to the own vehicle 70. A factor that the trajectory T becomes closer to the actual trajectory resides in that the difference in azimuth between the other vehicle 80 and the roadside object 200 as seen from the radar device 20 becomes larger as the other vehicle 80 approaches the own vehicle 70. Specifically, when the other vehicle 80 becomes closer to the own vehicle 70, the difference in azimuth between the other vehicle 80 and the roadside object 200 with peaks at the same positions exceeds the azimuth resolution of the radar in the frequency spectrums Sp_up and Sp_dn. Accordingly, the azimuth of the other vehicle 80 and the azimuth of the roadside object 200 can be separately calculated. Other factors that the trajectory T becomes closer to the actual trajectory reside in that, as the other vehicle 80 approaches the own vehicle 70, the roadside object 200 is hidden behind the other vehicle 80 and the radar device 20 no longer receives reflected waves from the roadside object 200, and that the reflection intensity of the other vehicle 80 becomes higher.

[5. Advantageous Effects]

According to the present embodiment described above, the following advantageous effects can be obtained.

(1) It is determined from the degree of randomness of the frequency spectrum generated using each of the FMCW mode and the 2FCW mode whether the peripheral environment of the vehicle is a complex environment decreasing the calculation accuracy of the azimuth θ of the object for that modulation mode. Then, the position P of the object is calculated with high accuracy using the azimuth θ of the object calculated using the modulation mode other than the modulation mode for which it is determined that the peripheral environment is a complex environment.

(2) At least one of the numbers of peaks in the frequency spectrums Sp_up, Sp_dn, and Sp_cw, the average values of peak powers, and the average power of the frequency spectrums can be used as an index of degree of randomness.

(3) For the two modulation modes FMCW and 2FCW, when the peripheral environment of the own vehicle 70 is a clear environment, averaging the azimuth θ of the object calculated for each of the FMCW mode and the 2FCW mode makes it possible to improve the stability of the azimuth θ of the object. This leads to improvement in the stability of the calculated position information of the object.

(4) The peripheral environment of the vehicle with a decrease in the calculation accuracy of the azimuth θ of the object differs between the FMCW mode and the 2FCW mode. Thus, even if the calculation accuracy of the azimuth θ of the object in either one of the modes decreases, the azimuth θ of the object can be frequently calculated with high accuracy on the other mode. Accordingly, using both or either of the azimuth θ of the object calculated using the FMCW mode and the azimuth θ of the object calculated using the 2FCW mode depending on the situation makes it possible to calculate the position P of the object with high accuracy.

Other Embodiments

An embodiment for carrying out the present disclosure has been described so far. However, the present disclosure is not limited to the foregoing embodiment but can be modified in various manners.

(a) In the foregoing embodiment, the plurality of modulation modes FMCW and 2FCW are used. However, the present disclosure is not limited to this. For example, as the plurality of modulation modes, pulse modulation mode and FMCW mode may be used or pulse modulation mode and 2FCW mode may be used. The plurality of modulation modes can include any combination of modulation modes. The 2FCW mode may be a multi-frequency CW mode in which continuous waves of three or more transmission frequencies are transmitted in sequence. Further, the plurality of modulation modes may include a combination of three or more modulation modes. In the case of using a combination of three or more modulation modes, when the peripheral environment of the own vehicle 70 is a clear environment for two or more of the modulation modes, the positions θ of the object calculated using the two or more modulation modes in a clear environment can be averaged and used for calculation of the position P of the object.

(b) In the foregoing embodiment, a plurality of functions possessed by one constituent element may be implemented by a plurality of constituent elements, or one function possessed by one constituent element may be implemented by a plurality of constituent element. In addition, a plurality of functions possessed by a plurality of constituent elements may be implemented by one constituent element, or one function implemented by a plurality of constituent elements may be implemented by one constituent element. Some of components of the foregoing element may be omitted. At least some of the components of the foregoing embodiment may be added to or replaced by other components of the foregoing embodiment. All modes included in the technical idea specified only in the claims are embodiments of the present disclosure.

(c) Besides the periphery monitoring radar device described above, the present disclosure can be carried out in various modes such as a system having the periphery monitoring radar device as a constituent element and an object detection method.

What is claimed is:

1. A periphery monitoring radar device that is mounted to a vehicle to monitor a periphery of the vehicle, comprising:
a transmission unit that is configured to transmit a combination of transmission signals modulated using a plurality of modulation modes as a radar wave;
a reception unit that is configured to generate a reception signal from a reflected wave from an object in the periphery of the vehicle, the object reflecting the radar wave transmitted by the transmission unit as the reflected wave;
a spectrum generation unit that is configured to, for each of the plurality of modulation modes, generate a frequency spectrum based on the reception signal generated by the reception unit;
an azimuth calculation unit that is configured, for each of the plurality of modulation modes, to:
extract one or more peaks corresponding to the object from a corresponding frequency spectrum generated by the spectrum generation unit, and
subject the extracted one or more peaks to azimuth development to accordingly calculate an azimuth of the object;
an environment determination unit that is configured to, for each of the plurality of modulation modes, determine whether a peripheral environment of the vehicle is a complex environment with a decrease in calculation accuracy of the azimuth for a corresponding modulation mode, based on a degree of randomness of the corresponding frequency spectrum generated by the spectrum generation unit; and
a position calculation unit configured to:
remove, upon the peripheral environment of the vehicle for at least one modulation mode in the plurality of modulation modes being determined to be the complex environment, at least one azimuth corresponding to the at least one modulation mode from the azimuths respectively calculated for the plurality of modulation modes to thereby obtain at least one target azimuth that is at least one of remaining azimuths except for the at least one azimuth that is removed; and
calculate a position of the object based on the at least one target azimuth.

2. The periphery monitoring radar device according to claim 1, wherein the environment determination unit is configured to determine, for each of the plurality of modulation modes, that the peripheral environment of the vehicle is the complex environment when at least one of the following conditions is satisfied:
(i) in a preset determination range, a number of the one or more peaks in the frequency spectrum is larger than a preset threshold;
(ii) in the determination range, an average value of peak power obtained by averaging values of power at the respective one or more peaks in the frequency spectrum is larger than a preset peak threshold; and
(iii) in the determination range, average power in the frequency spectrum is larger than a preset average threshold.

3. The periphery monitoring radar device according to claim 1, wherein the position calculation unit is configured to, when there are two or more of the modulation modes where the environment determination unit does not determine that the peripheral environment of the vehicle is the complex environment, calculate the position of the object using an average value of the azimuths calculated by the azimuth calculation unit using a corresponding two or more of the modulation modes.

4. The periphery monitoring radar device according to claim 3, wherein the plurality of modulation modes includes an FMCW mode and a 2FCW mode.

* * * * *